United States Patent
Koerner (12)

(10) Patent No.: US 6,170,463 B1
(45) Date of Patent: Jan. 9, 2001

(54) METHOD AND APPARATUS FOR OPTIMIZING ENGINE OPERATION

(75) Inventor: Scott Koerner, Kenosha, WI (US)

(73) Assignee: Outboard Marine Corporation, Waukegan, IL (US)

( * ) Notice: Under 35 U.S.C. 154(b), the term of this patent shall be extended for 0 days.

(21) Appl. No.: 09/263,799

(22) Filed: Mar. 5, 1999

(51) Int. Cl.$^7$ .................. F02P 5/15; F02D 41/04
(52) U.S. Cl. .................. 123/406.2; 123/406.47; 701/104; 701/115
(58) Field of Search .................. 123/406.2, 478, 123/480, 406.45, 406.47; 701/103, 104, 105, 114, 115

(56) References Cited

U.S. PATENT DOCUMENTS

| 4,200,064 | 4/1980 | Engele ..................... 123/674 |
|---|---|---|
| 4,223,644 | 9/1980 | Latsch et al. ............ 123/436 |
| 4,271,804 | 6/1981 | Bianchi et al. .......... 123/674 |
| 4,379,332 | 4/1983 | Busser et al. ........... 701/105 |
| 4,402,294 | 9/1983 | McHugh et al. ........ 123/480 |
| 4,705,000 | 11/1987 | Matsumura et al. ... 123/357 |
| 4,972,293 | 11/1990 | Verner ..................... 361/187 |
| 5,016,591 | * 5/1991 | Nanyoshi et al. ....... 123/406.2 |
| 5,050,084 | * 9/1991 | Nakaniwa ................ 701/104 |
| 5,086,743 | 2/1992 | Hickey .................... 123/468 |
| 5,111,405 | * 5/1992 | Maeda et al. ........... 123/406.2 |
| 5,148,791 | * 9/1992 | Nagano et al. .......... 123/406.2 |
| 5,150,690 | 9/1992 | Carter et al. ............ 123/527 |
| 5,634,448 | 6/1997 | Shinogle et al. ........ 123/480 |
| 5,899,189 | * 5/1999 | Adelsperger et al. ... 701/104 |

* cited by examiner

Primary Examiner—Willis R. Wolfe
(74) Attorney, Agent, or Firm—Armstrong Teasdale LLP (57) ABSTRACT

A method and apparatus for optimizing desired operational characteristics of an engine having a positionable throttle and a plurality of cylinders wherein data representing the same gross amount of fuel to be injected into all of the cylinders at any given throttle position and engine RPM setting is provided to obtain a gross optimization of the desired engine operational characteristics and the data representing the gross amount of fuel to be provided to each cylinder is adjusted for each cylinder individually at any given RPM setting to provide data representing a specific amount of fuel to be provided to each cylinder individually to optimize the desired engine operational characteristics with respect to fuel injection.

16 Claims, 3 Drawing Sheets

METHOD AND APPARATUS FOR OPTIMIZING ENGINE OPERATION

BACKGROUND OF THE INVENTION

1. Field of the Invention

The present invention relates in general to adjusting fuel and timing operations of an engine to optimize desired operating characteristics of the engine and in particular to a method and apparatus for adjusting the fuel flow and ignition timing for each engine cylinder individually to optimize desired operating characteristics of the engine as a whole.

2. Description of Related Art Including Information Disclosed Under 37 CFR 1.97 AND 1.98

In order to optimize engine performance with today's technology, it is well known to inject fuel into engine cylinders in a known quantity while monitoring desired engine operating characteristics such as torque, emissions, and the like. These tests are made for a plurality of engine operating RPM settings and throttle positions. Thus, for a given throttle position and engine speed, a voltage is applied to the fuel injector for a period of time known as the pulse width. The duration of the voltage pulse determines the amount of fuel injected into a cylinder. This pulse-width is varied until the optimum desired operating engine conditions that are being monitored are achieved. Then the throttle position and engine speed are changed to a new throttle position and engine speed and the desired engine operating characteristics are monitored again while the pulse-width is varied to vary the amount of fuel being injected into the cylinders and the optimum pulse-width is again noted. When this is accomplished for a desired number of throttle positions and RPM settings over a given range, the gross pulse-width data value for each throttle position versus engine RPM is stored in a two-dimensional data storage cell array. A microprocessor is coupled to the data storage cell and during engine operation, when the throttle is in a given position and the RPM is at a given setting, the microprocessor selects the pulse-width value stored in the table for that throttle position and RPM setting and causes the same desired amount of fuel to be injected into each cylinder. Thus, optimum operation of the engine as a whole is achieved based upon the desired engine operating characteristics to be achieved and, at each throttle position and RPM setting, the same pulse-width stored for that throttle position and RPM setting causes the same amount of fuel to be applied to all cylinders to cause optimum operation of the engine.

Also, for the same throttle positions and RPM settings, the timing of the ignition is varied and the desired operating characteristics of the engine are monitored until the proper ignition timing is obtained for each of the throttle positions and RPM settings to achieve the desired optimum engine operating conditions. These settings are again stored in a second two-dimensional table representing throttle position versus RPM setting. The microprocessor, again, at any given throttle position and RPM setting will look into the table and pick the ignition timing value stored therein and cause that same ignition timing to be applied to all of the cylinders to again achieve the desired optimum engine operating conditions.

It has been found, however, that a number of conditions exists which may cause a variation between the operation of one cylinder with respect to another. Thus, for instance, in a four-cycle or two-cycle engine, it has been found that the volume of the combustion chamber varies from cylinder-to-cylinder and causes variable compression rates. In addition, it has been found that there is a difference between "in-cylinder" temperatures because of a variation in cooling paths to each cylinder and the like. Further, the length of the path of the air intake and of the exhaust also varies from cylinder-to-cylinder which causes a variation in the optimum operation of one cylinder with respect to another. In addition, in two-cycle engines, exhaust tuning as well as intake and exhaust port location vary from cylinder-to-cylinder and thus create differences in operation between cylinders.

Therefore, if the same fuel control pulse width is used to cause the same amount of fuel to be applied to each cylinder and if the same ignition timing is applied to each cylinder at each given throttle position and RPM setting to cause the ignition to occur at identical crankshaft positions, the engine may not operate at its ultimate optimum operating conditions because of the variation in operation between cylinders.

Therefore, it would be advantageous if the operating characteristics of an engine could be optimized by adjusting the amount of fuel flow and ignition timing to each cylinder individually.

SUMMARY OF THE INVENTION

The present invention relates to the optimization of engine operation wherein each engine cylinder has a coefficient of variance, represented by a pressure-versus-time curve, during each ignition of fuel therein. The intent of the invention is to cause, as nearly as possible, the optimum coefficient of variance for all cylinders at any given throttle position and RPM setting. A first two-dimensional data storage cell array represents a throttle position versus engine RPM setting and stores a gross pulse-width data value in each cell representing the same amount of fuel to be charged into each of the engine cylinders for each given throttle position and RPM setting to optimize operation of the engine as a whole. A microprocessor is coupled to the first two-dimensional array for retrieving the stored gross pulse-width data for any given throttle position and RPM setting and causing the same amount of fuel to be injected to all of the cylinders at the proper time.

By adjusting the pulse-width data value for each cylinder individually, a specific pulse-width data value is obtained for each cylinder that represents the amount of fuel for each cylinder in order to achieve the optimum coefficient of variance of that specific cylinder at corresponding RPM settings used in the first two-dimensional data storage cell array. Therefore, each cylinder can be caused to operate at its optimum coefficient of variance to provide optimized engine operation as a whole. A first at least one-dimensional array of data storage cells is created for each cylinder with each cell corresponding to an RPM setting used in the first two-dimensional data storage cell array. Stored in each data storage cell of each of the first one-dimensional arrays for each cylinder is a correction pulse-width data value representing the difference between the gross data pulse-width value and the specific pulse-width data value for a corresponding cylinder at each of the RPM settings. By coupling each of the one-dimensional data arrays to the microprocessor along with a two-dimensional array, the microprocessor can algebraically add each of the gross pulse-width data values to the correction pulse-width values for each cylinder at each corresponding RPM setting to optimize operation of each cylinder individually with respect to fuel injection.

The same thing can be done with the ignition timing. Again, there is a second two-dimensional data storage cell array coupled to the microprocessor that stores gross ignition timing data values representing the same relative time of ignition of the fuel in all of the cylinders for any given throttle position and RPM setting. The present method adjusts the ignition timing of each cylinder individually to obtain a specific ignition timing data value for each cylinder that represents the optimum coefficient of variance of that specific cylinder at corresponding RPM settings stored in the second two-dimensional data storage cell array. A second at least one-dimensional array of data storage cells for each cylinder is created with each cell corresponding to an RPM setting used in the second two-dimensional data storage cell array. A correction ignition timing data value representing the difference between the gross timing data value and the specific ignition timing data value for the corresponding cylinder at each of the RPM settings is stored in each data storage cell of each of the second one-dimensional array. By coupling each of the second one-dimensional data arrays to the microprocessor along with the second two-dimensional data storage cell array, algebraic addition of each of the gross timing data values to the corresponding ones of the correction ignition timing data values for each cylinder at each corresponding RPM setting can take place to optimize operation of each cylinder individually and the engine as a whole. The present method and apparatus can be used for optimizing the operation of a two-cycle engine or a four-cycle engine.

Thus, it is an object of the present invention to optimize engine operation with both a gross pulse-width data value representing the same amount of fuel to be charged into all of the engine cylinders for each given throttle position and RPM setting and a correction pulse-width data value that is then algebraically added to that gross pulse-width data for each cylinder individually at a corresponding RPM setting to thereby optimize operation of each cylinder individually with respect to the fuel injection.

It is also an object of the present invention to have a two-dimensional data storage cell array representing throttle position versus engine RPM setting for storing a gross pulse-width data value in each cell representing the amount of fuel to be charged into all of the engine cylinders for each given throttle position and RPM setting and to provide a first one-dimensional array of data storage cells for each cylinder with each cell corresponding to an RPM setting used in the first two-dimensional data storage cell array and storing in each data storage cell of each of the one-dimensional arrays for each cylinder a correction pulse-width data value representing the difference between the gross data pulse-width value and a specific pulse-width data value for a corresponding cylinder at each of the RPM settings.

It is still another object of the present invention to adjust both the amount of fuel to be charged into an engine cylinder through a variable pulse-width as well as to vary the ignition timing for optimum engine operation at corresponding throttle positions and engine RPM settings.

It is still another object of the present invention to provide a coarse tuning of the engine through adjusting the same coarse amount of fuel to be provided to all of the cylinders and to fine tune the engine by adjusting the amount of fuel to be applied to each cylinder individually so that each cylinder has its own amount of fuel which may or may not differ from the amount of fuel provided to any other cylinder.

Thus, the present invention relates to a method of optimizing desired operational characteristics of an engine having a positionable throttle and a plurality of cylinders comprising the steps of providing the same gross amount of fuel to all of the cylinders at given throttle positions and engine RPM settings to obtain a gross optimization of the desired engine operational characteristics and adjusting the amount of fuel provided to each cylinder individually at any given throttle position and engine RPM setting to provide a specific amount of fuel to each cylinder individually to optimize the desired engine operational characteristics.

It is also an object of the present invention to provide a system for optimizing desired operational characteristics of an engine having a positionable throttle and a plurality of cylinders comprising a two-dimensional data storage cell array for storing data representing the same gross amount of fuel to be provided to all of the cylinders at any given engine RPM setting and throttle position to obtain a gross optimization of the desired engine operational characteristics, a one-dimensional data storage cell array for each of the cylinders, each cell storing data representing a corrected amount of fuel to be added to or subtracted from the gross amount of fuel to be provided to each cylinder individually at any given engine RPM setting to obtain a specific amount of fuel to be provided to each cylinder individually to further optimize the desired engine operational characteristics, and a microprocessor coupled to the two-dimensional data storage cell array and to the one-dimensional data storage cell array for combining the stored data to generate a signal representing a specific amount of fuel to be provided to each cylinder individually at any given engine RPM to obtain the desired engine operational characteristics.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

The present invention will be described in particular in relation to a two-cycle outboard marine engine. However, it could certainly be utilized with a four-cycle engine, a diesel engine or any other internal combustion engine.

Figure 1:
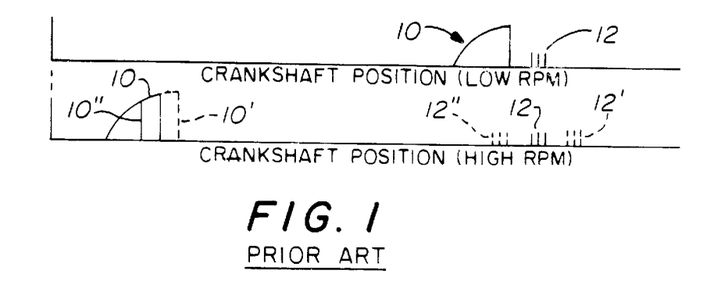
FIG. 1 is a graph illustrating how the position of the fuel injection pulse and the ignition timing may be varied with respect to crankshaft position.

It is well known in the art that the torque of an engine, the engine speed, engine emissions, and engine temperature can be optimized by adjusting the amount of the fuel applied to all cylinders (and the time at which that fuel is ignited) by using fuel injectors such as that disclosed in U.S. Pat. No. 5,687,050, incorporated herein by reference in its entirety. The amount of fuel injected into an engine cylinder can be controlled by the pulse-width applied to the fuel injector to force a predetermined amount of fuel from it and then closing it, thus allowing only a particular quantity of fuel to be injected into the cylinder. Thus, as can be seen in FIG. 1(a), curve 10 represents the pulse width applied to a fuel injector to cause a certain amount of fuel to be injected into the cylinder. In like manner, pulses 12 indicate the ignition pulses that are supplied to the spark plug to ignite the fuel some predetermined period of time after injection of the fuel into the cylinders.

It is also well known that as the RPM of the engine increases, the fuel must be injected into the cylinders at a much earlier crankshaft position for most efficient operation of the engine. Thus, as shown in FIG. 1(b), pulse 10 has moved a greater distance away from the ignition pulses 12 at high engine RPM's. It was also known that by adjusting the pulse-width 10 to a width 10' or 10" as shown in FIG. 1(b), while monitoring the desired engine characteristics such as torque, RPM, emissions, and temperature, that the operation of the engine could be optimized for desired engine operating characteristics. In like manner, it was discovered that if the ignition timing pulses 12 were varied between a range 12' or 12" , as shown in FIG. 1(b), while observing the desired engine operating characteristics such as torque, engine speed, emissions, and temperature, that the desired engine operating characteristics could be further improved.

Figure 2:
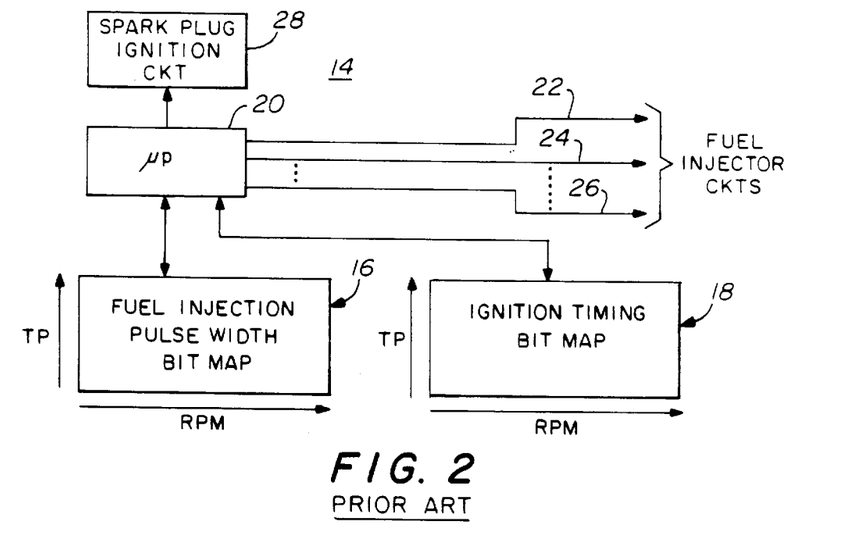
FIG. 2 is a block diagram of a prior art system for optimizing operational characteristics of an engine by adjusting the fuel injection pulse-width to all cylinders for a given throttle position and RPM setting and for varying ignition timing to all cylinders for a given throttle position and RPM setting.

Thus, as shown in FIG. 2, which is a block diagram 14 of the prior art system for optimizing engine operating characteristics, a first two-dimensional data storage cell array 16 was created which represented throttle position versus engine RPM setting and stored a gross pulse-width data value in each cell representing the same amount of fuel to be charged into all of the engine cylinders for each given throttle position and RPM setting to optimize operation of the engine as a whole. Thus, for example only, by rennin the engine at 1000 RPM and adjusting the fuel injection pulse-width, the torque of the engine could be maximized, emissions could be minimized, and/or operating temperature could be maintained at a desired valve. For a selected RPM setting and throttle position, an optimum fuel injection pulse-width is determined and stored that would optimize the desired engine operating characteristics. This process was repeated for a plurality of throttle positions and RPM settings until an entire bit map was created that stored the gross pulse-width data value in each cell representing the same amount of fuel to be charged into all of the engine cylinders at each given throttle position and RPM setting to optimize operation of the engine as a whole with respect to fuel injection. The microprocessor 20 could then, at any given throttle position and RPM setting, select from the storage array the correct pulse-width to determine the fuel injection that would optimize engine operations with respect to fuel injection.

In like manner, a second two-dimensional data storage cell array 18 was created that also represented throttle position versus engine RPM setting for storing a gross ignition timing signal in each cell representing the time at which ignition should occur in all of the cylinders for each given throttle position and RPM setting to further optimize operation of the engine as a whole with respect to ignition timing. The microprocessor 20 is connected to both of the first and second two-dimensional data storage cell arrays 16 and 18 and monitors engine RPM and throttle setting in a well-known manner and, at each given RPM setting and throttle position, the microprocessor 20 checks the stored data in the two-dimensional data storage cell arrays 16 and 18 and causes signals on lines 22, 24, and 26 to the various fuel injector circuits to cause the same amount of fuel to be charged into each cylinder based on the fuel injection pulse-width data stored in the bit map 16. It also caused the proper ignition of all the spark plugs 28 at the same relative time based on the data stored in the ignition timing bit map 18 for any given RPM setting and throttle position.

Thus, the system illustrated in FIG. 2 greatly improved the operation of the engine based on desired engine operating characteristics such as torque, engine speed, emissions, and temperature.

Figure 3:
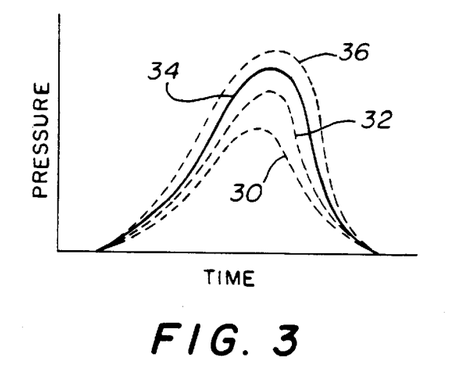
FIG. 3 is a graph illustrating how the cylinder pressure can vary from cycle to cycle with respect to the system shown in FIG. 2 resulting in a high coefficient of variance.

It is also known, of course, that each engine cylinder has a coefficient of variance (COV) that is a number representing the consistency of the pressure-versus-time curve for that cylinder. A high COV indicates that the combustion is inconsistent and, therefore, that the cylinder operation is probably not optimized. A pressure-versus-time curve occurring during each ignition of fuel is shown in FIG. 3. The area under each of these curves illustrates the amount of pressure being developed in a given cylinder during fuel ignition. Thus, for example only, a first cylinder may develop a pressure as shown by graph 30, while a second cylinder may develop that shown by graph 32, while a third cylinder may develop a pressure as illustrated by curve 34 and, finally, a fourth cylinder may generate a pressure as represented by curve 36. Clearly, this indicates that each cylinder is operating with a different energy output. They resemble a team of horses that are not pulling together and yet those operating conditions shown in FIG. 3 were developed by optimizing the fuel injection pulse-width and the ignition timing with the system shown in FIG. 2.

Thus, it was realized that, for some reason or reasons, each of the cylinders was producing a different output energy even though the engine operation as a whole was optimized.

Figure 4:
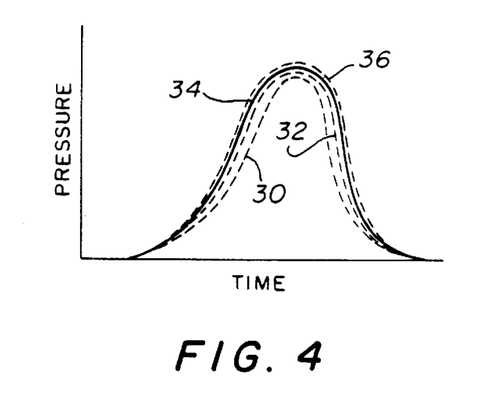
FIG. 4 is a graph of the cylinder pressure of the engine cylinders as adjusted by the present invention to provide a more consistent pressure in each cylinder during ignition.

It was recognized that there was a need for, and the present invention sets forth, a system that would cause each of the cylinders to have a low coefficient of variance indicating that each cylinder is performing well. FIG. 4 respresents the pressure-versus-time curves for cylinder whose operation is optimized with the present invention. Thus, all cylinders are carrying approximately the same load.

There are a number of reasons why a cylinder may operate with inconsistent pressure variations (high COV) when the same amount of fuel is applied to each cylinder with the same relative ignition timing pulse applied to each cylinder. In all IC engines, it has been found that the actual volume of the combustion chambers varies from cylinder-to-cylinder, thus giving variable compression rates. Further, there is a difference in "in-cylinder" temperatures because of the length of cooling paths and the like. Also, the path lengths of both the air intake and the exhaust may vary, thus causing each cylinder to operate somewhat differently.

In two-cycle engines, in addition to those factors set forth in general for IC engines, exhaust tuning and intake and exhaust port location may vary from cylinder-to-cylinder, thus creating a difference in operation of each of the cylinders when the same amount of fuel and the same relative timing pulse is applied to each cylinder.

Figure 5:
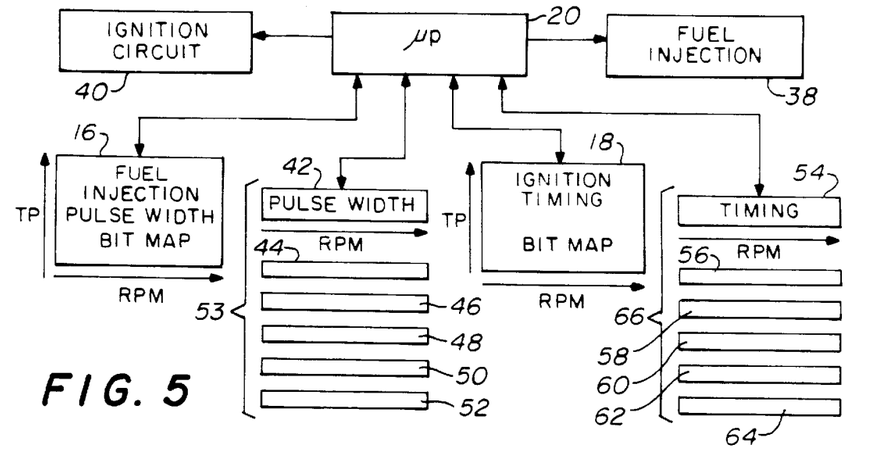
FIG. 5 is a block diagram of the present invention illustrating how the quantity of fuel injected into each cylinder and the timing of ignition for each cylinder can be varied individually to obtain the optimized coefficient of variance for each cylinder as illustrated in FIG. 4.

FIG. 5 is a block diagram of the system of the present invention that enables the pressure variations in each cylinder to be very similar (low COV) and thus optimizes the torque of the engine, engine speed, emissions, and temperatures as desired. In FIG. 5, a fuel injection pulse-width bit map 16 and an ignition timing bit map 18, identical to those disclosed in FIG. 2, are utilized to store the gross pulse-width data value in each of their cells that represents the same amount of fuel to be charged into each engine cylinder for each given throttle position and RPM setting and to store an ignition tiring signal that is to be applied to all spark plugs in all cylinders for each of the same given throttle positions and RPM settings at the same relative time to optimize operation of the engine as a whole. Again, a microprocessor 20 is connected to the bit maps 16 and 18 to supply the same fuel pulse-width to the fuel injectors 38 and the proper ignition timing pulse to the ignition circuits 40 at the same relative time.

However, as can be seen in FIG. 5, a group 53 of at least one-dimensional arrays of data storage cells 42, 44, 46, 48, 50, and 52 is created, one for each corresponding cylinder, with each cell of each array corresponding to an RPM setting used in the first two-dimensional data storage cell array 16.

Thus, for the first cylinder, at a given RPM and throttle position setting, the pulse-width data value stored in table 16 for that cylinder is adjusted by microprocessor 20 with the data in the corresponding one-dimensional array to obtain a specific pulse-width data value that represents the optimum pressure variation (low COV) of that specific cylinder for the desired engine operating characteristics at each corresponding RPM setting in the first two-dimensional data storage cell array. Stored in each data cell of each of the first one-dimensional arrays for each cylinder is a correction pulse-width data value that represents the difference between the gross data pulse-width value stored in table 16 and the specific pulse-width data value that was obtained by adjusting the gross pulse-width data value for each cylinder at each of the RPM settings to obtain optimized desired engine operational characteristics. This is done for each cylinder at each corresponding RPM setting utilized in table 16. This process is repeated for each of the other cylinders and, for a six-cylinder engine, would include in the group 53 the one-dimensional arrays of data storage cells 44, 46, 48, 50, and 52, one for each of the other cylinders. Obviously, for a four-cylinder engine, only arrays 44, 46, 48, and 50 would be used.

Thus, when microprocessor 20 determines a particular RPM setting and throttle position, it accesses table 16 at that throttle position and RPM setting to determine the gross pulse-width data value representing the amount of fuel to be charged into the engine cylinders and then adds to or subtracts from that value the correction value stored in the corresponding one-dimensional array of data storage cells 42 for that same RPM setting, thus optimizing the coefficient of variance for each cylinder individually with respect to fuel injection.

Thus, in the present system, the same gross amount of fuel that is to be provided to all of the cylinders at any given throttle position and engine RPM setting is adjusted at each cylinder individually by the correction pulse-width stored in the cells in the corresponding one-dimensional array 42 for the corresponding RPM setting. This enables each cylinder to have an improved coefficient of variance, thus providing the optimum operation of the engine.

In like manner, an ignition timing bit map 18 stores data representing an ignition timings signal that would cause ignition in each of the cylinders to occur at the same relative time with respect to engine crankshaft position for any given throttle position and engine RPM setting. Again, by providing a group 66 of at least one-dimensional arrays of data storage cells 54–64 for each corresponding cylinder with each cell in each array corresponding to an RPM setting used in the first two-dimensional data storage cell array and by again adjusting each cylinder timing individually while checking the desired engine operational characteristics to obtain optimum operational characteristics, a correctional timing value can be stored in each cell of the one-dimensional arrays that corrects the gross ignition timing for that corresponding cylinder at a corresponding RPM setting. Thus, the ignition timing signal that is applied to each cylinder is adjusted individually for any given engine RPM setting to cause ignition to occur at a specific time (gross ignition time±correctional timing value) in each cylinder individually to optimize the engine operational characteristics with respect to ignition timing. Again, there is one of the at least one-dimensional array of data storage cells 54–64 for each of a corresponding one of the cylinders.

Thus, with the present system, the fuel injection pulse-width bit map 16 provides data representing a pulse-width that causes the same gross amount of fuel to be injected into all cylinders at any given throttle position and engine RPM setting to obtain a gross optimization of the desired engine operating characteristics. The correctional pulse-width data in the at least one-dimensional array of data storage cells 42–52 is used by the microprocessor 20 to adjust the pulse-width data representing the gross amount of fuel to be provided to each cylinder individually at any given engine RPM setting to provide a specific amount of fuel to each cylinder individually to optimize the desired engine operational characteristics with respect to fuel injection.

In like manner, ignition timing bit map 18 stores a gross ignition timing signal that would cause ignition in each of those cylinders to occur at the same time with respect to the engine crankshaft position for any given throttle position and engine RPM setting while each of the one-dimensional data storage cell arrays 54–64 provides correctional ignition timing data that adjusts the gross stored ignition timing signal in bit map 18 to cause ignition to occur at a specific time in each cylinder individually for any given engine RPM setting to further optimize the engine operating characteristics with respect to ignition timing.

Figure 6:
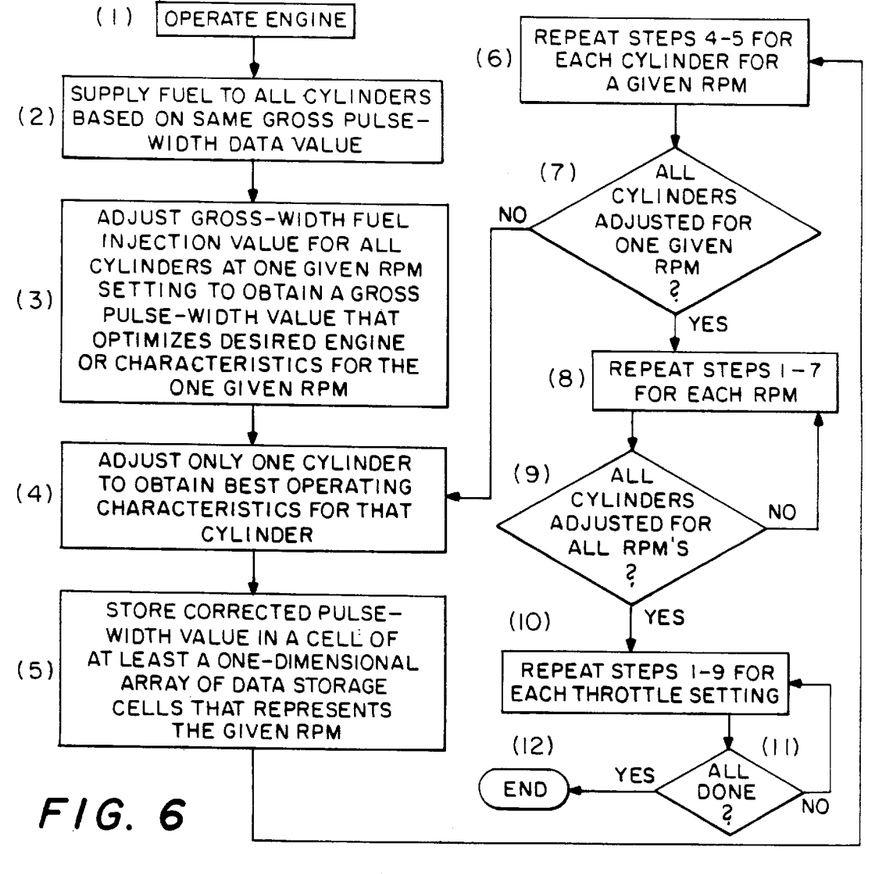
FIG. 6 is a flow chart illustrating the method of obtaining a specific amount of fuel to be injected into each cylinder.
Figure 7:
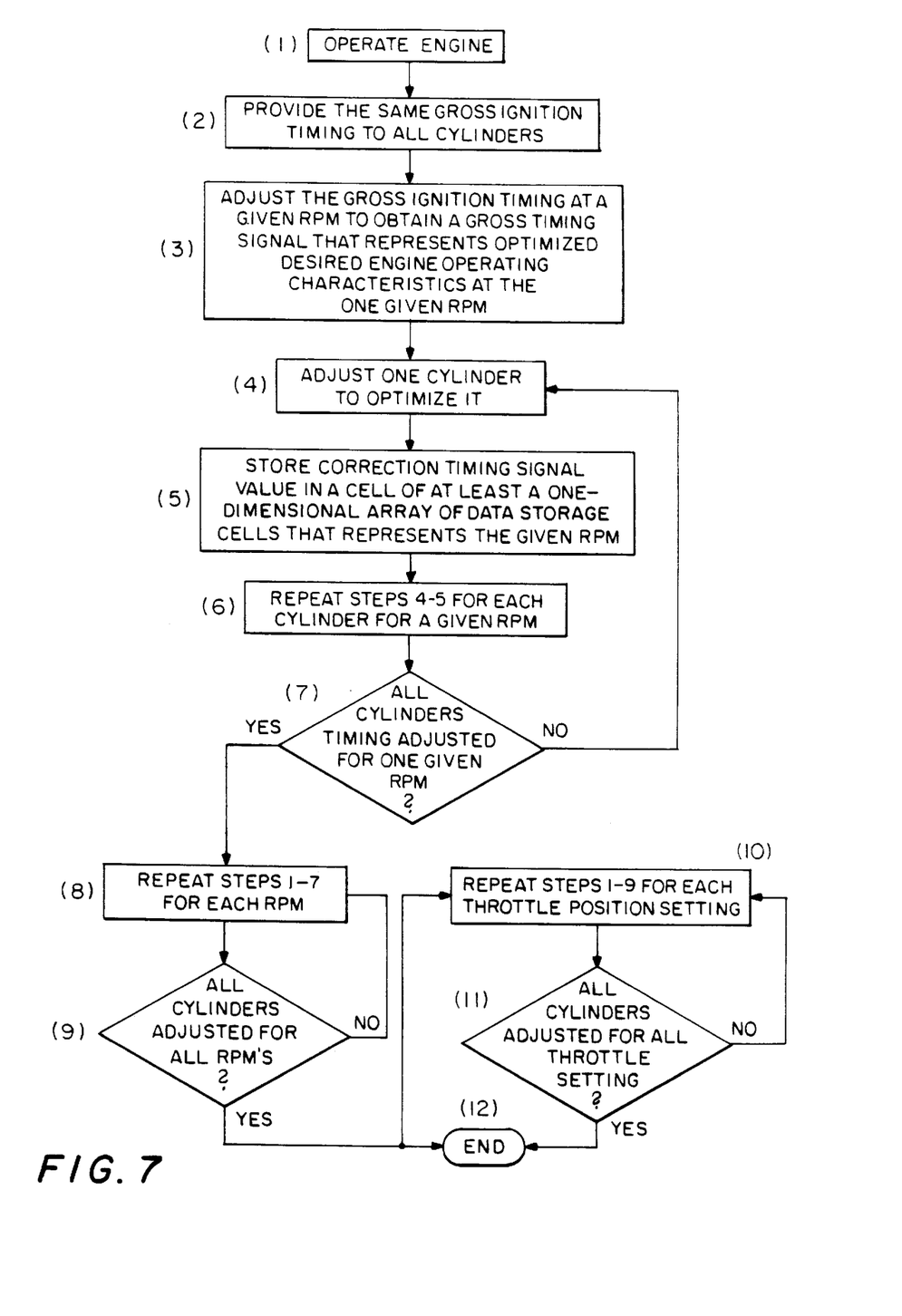
FIG. 7 is a flow chart illustrating the method of obtaining a specific ignition timing signal to be used to cause proper fuel ignition in each cylinder.

FIGS. 6 and 7 are flow charts representing the steps to adjust the fuel flow pulse-width and the ignition timing to provide the optimum operation of each cylinder individually.

As can be seen in FIG. 6, at step 1, the engine is operated. At step 2, fuel is supplied to all the cylinders based on the same gross pulse-width data value stored in storage array 16 in FIG. 5. At step 3, the gross pulse-width fuel injection data value is adjusted for all cylinders at one given RPM setting to obtain a pulse-width value that optimizes the desired engine operating characteristics at the one given RPM setting. At step 4, the specific pulse-width for one given cylinder is adjusted and the correction value is added to or subtracted from the gross pulse-width value at the given RPM setting to optimize the given cylinder's operation. At step 5, the correction pulse-width value is stored in a cell of at least a one-dimensional array of data storage cells that represents the given RPM setting. At step 6, steps 4–5 are repeated for the plurality of cylinders for the given RPM settings. At step 7, it is determined if each cylinder has been adjusted for given RPM settings. If not, the process is repeated from step 4 until each cylinder has been adjusted for the given RPM settings. At that time, at step 8, steps 1–7 are repeated for each of the remaining RPM settings. At step 9, if all of the cylinders have not been adjusted for all RPM settings, then step 8 is repeated. If all of the cylinders have been adjusted for all RPM settings at step 9, then at step 10 the process repeats for each throttle setting until each of the cylinders has been adjusted for all throttle settings. The process ends at step 12.

Thus, fuel pulse-width correction values are stored in the one-dimensional array of storage cells 42, 44, 46, 48, 50, and 52 as shown in FIG. 5, one for each of the cylinders which, in this example, happens to be six cylinders. As explained earlier, during operation the microprocessor 20 then corrects the gross pulse-width value from table 16 for a given RPM setting with the correction value stored in each of the tables 42–52 for a given cylinder that is to receive fuel. Thus, if cylinder 1 is to receive X quantity of fuel from table 16, it is corrected by adding or subtracting a Y value from table 42 at the same RPM setting to obtain the specific pulse-width value that is used to cause the proper amount of fuel to be injected into the cylinder. The process is, of course, repeated for each cylinder for each given RPM setting.

In like manner, FIG. 7 illustrates the flow chart for correcting the ignition timing. Again, at step 1, the engine is operated. At step 2, the same gross ignition timing is provided to all cylinders from the data storage array 18 in FIG. 5. At step 3, the gross ignition timing for all cylinders is adjusted at a given RPM setting to obtain a specific timing signal that represents optimized desired engine operating characteristics at the one given RPM setting. At step 4, the specific timing signal for are given cylinder is adjusted and added to or subtracted from the gross timing signal at the given RPM setting to optimize the operation of the one given cylinder at that given RPM setting. At step 5, the correction timing signal value is stored in a cell of at least a one-dimensional array of data storage cells that represents the given RPM setting . At step 6, steps 4–5 are repeated for the all cylinders for one given RPM settings. At step 7, it is determined if each cylinder timing has been adjusted for the one given RPM settings. If not, steps 4–6 are repeated until they are. At step 8, steps 1–7 are repeated for each of the other RPM settings. At step 9, it is determined if all cylinders have been adjusted for all RPM settings. If not, step 8 is repeated. If it has, then the process is repeated for each cylinder for each throttle position setting. The process ends at step 12.

It is to be understood, of course, that the at least one-dimensional array of data storage cells such as 42 and 54 in FIG. 5 could be two-dimensional array corresponding to the bit maps 16 and 18. However, for simplicity, once the bit maps 16 and 18 have been established, then corrected values need to be stored in the one dimensional array data storage cells only at corresponding given RPM settings.

The corresponding structures, materials, acts, and equivalents of all means or step plus function elements in the claims below are intended to include any structure, material, or act for performing the function in combination with other claimed elements as specifically claimed.

What is claimed is:

1. A method of optimizing desired operational characteristics of an engine having a crankshaft, a positionable throttle, and a plurality of cylinders, said method comprising the steps of:

storing data representing the same gross amount of fuel to be injected into all of said cylinders at any given throttle position and engine RPM setting to obtain a gross optimization of said desired engine operational characteristics;

storing data representing a correction value representing a difference between the gross amount of fuel and an optimal amount of fuel to be injected into all of the cylinders; and adjusting the stored data representing the gross amount of fuel to be provided to each cylinder individually at any given engine RPM setting by the stored correction value to each cylinder individually to optimize said desired engine operational characteristics with respect to fuel injection.

2. The method of claim 1 further including the steps of:

storing data representing an ignition timing signal that would cause ignition in each of said cylinders to occur at the same time with respect to the engine crankshaft position for any said given throttle position and engine RPM setting;

storing data representing a correction value representing a difference between the ignition timing signal causing ignition in each of said cylinders to occur at the same time and an optimal timing signal causing ignition in each of said cylinders to occur at a specific time; and adjusting said data representing the stored ignition timing signal for each cylinder individually for any given engine RPM setting by the stored correction value in each cylinder individually to optimize said engine operating characteristics with respect to ignition timing.

3. In a method of optimizing desired engine operational characteristics wherein each engine cylinder has a pressure-versus-time variation during ignition of fuel therein and including the steps of storing a gross pulse-width data value in each cell of a first two-dimensional data storage cell array representing throttle position versus engine RPM, said gross pulse-width data value representing the amount of fuel to be charged into each of said engine cylinders for each given throttle position and RPM setting to optimize operational characteristics of the engine as a whole, and retrieving the stored gross pulse-width data for any given throttle position and RPM setting with a microprocessor coupled to said first two-dimensional array for causing the same amount of fuel to be injected into all of said cylinders at the proper time, the improvement comprising the steps of:

adjusting the pulse-width data value for each cylinder individually to obtain a specific pulse-width data value for each cylinder that represents the optimum pressure-versus-time variations operation of that specific cylinder for said desired engine operating characteristics at corresponding RPM settings in said first two-dimensional data storage cell array;

creating a first at least one-dimensional array of data storage cells for each cylinder with each cell corresponding to an RPM setting used in said first two-dimensional data storage cell array;

storing in each data storage cell of each of said first one-dimensional arrays a correction pulse-width data value representing the difference between the gross data pulse-width value and the specific pulse-width data value for a corresponding cylinder at each of said RPM settings; and coupling each of said one-dimensional data arrays to said microprocessor for algebraic addition of each of said correction pulse-width data values to a corresponding one of said gross pulse-width values for each cylinder at each corresponding RPM setting to optimize operation of each cylinder individually with respect to fuel injection.

4. The improved method of claim 3 further including the step of forming said at least one-dimensional array of data storage cells as a two-dimensional array representing throttle position versus engine RPM.

5. In the improved method of claim 3 further including the step of storing gross ignition timing data values representing the time of ignition of the fuel in all of said cylinders for any given throttle position and RPM setting in a second standard two-dimensional data storage cell array coupled to said microprocessor to further optimize operation of said engine as a whole using the ignition timing, the improvement comprising the steps of:

adjusting the ignition timing of each cylinder individually to obtain a specific ignition timing data value for each cylinder that represents the optimum operation of that specific cylinder at corresponding RPM settings used in said second two-dimensional data storage cell array;

creating a second at least one-dimensional array of data storage cells for each cylinder with each cell corresponding to an RPM setting used in said second two-dimensional data storage cell array;

storing in each data storage cell of each of said second one-dimensional arrays a correction ignition data value for each cylinder representing the difference between the gross timing data value and the specific ignition timing data value for the corresponding cylinder at each of said RPM settings; and coupling each of said second one-dimensional data arrays to said microprocessor for algebraic addition of each of said gross timing data values to corresponding ones of said correction ignition timing data values for each cylinder at each corresponding RPM setting to optimize operation of each cylinder individually.

6. The method of claim 5 further including the step of forming said second at least one-dimensional array of data storage cells as a two-dimensional array representing throttle position versus engine RPM.

7. The method of claim 5 further including the step of optimizing the operation of a two-cycle engine.

8. The method of claim 5 further including the step of optimizing the operation of a four-cycle engine.

9. The method of claim 5 including the step of optimizing the operation of and internal combustion engine with a plurality of combustion chambers.

10. A system for optimizing desired operational characteristics of an engine having a positionable throttle and a plurality of cylinders, said system comprising:

a two-dimensional data storage cell array for storing data representing the same gross amount of fuel to be provided to all of said cylinders at any given engine RPM setting and throttle position to obtain a gross optimization of said desired engine operational characteristics;

a one-dimensional data storage cell array for each of said cylinders, each cell in said one-dimensional array storing data representing a corrected amount of fuel to be added to or subtracted from said gross amount of fuel to be provided to each cylinder individually at any given engine RPM setting to obtain a specific amount of fuel to be provided to each cylinder individually to optimize said desired engine operational characteristics; and a microprocessor coupled to said two-dimensional data storage cell array and to said one-dimensional data storage cell array for combining said stored data to generate a signal representing said specific amount of fuel to be provided to each cylinder individually at any given engine RPM setting to obtain said desired engine operational characteristics.

11. An improved system for optimizing engine operation wherein each engine cylinder has a coefficient of variance of its pressure-versus-time curve, occurring during ignition of fuel therein, said system including a first two-dimensional data storage cell array, representing throttle position versus engine RPM for storing a single gross pulse-width data value in each cell representing the same amount of fuel to be charged into all of said engine cylinders for each given throttle position and RPM setting to optimize operation of the engine as a whole, and a microprocessor coupled to said first two-dimensional array for retrieving the stored gross pulse-width data value for any given throttle position and RPM setting and causing the same amount of fuel to be injected into all of said cylinders at the proper time, the improved system comprising:

a first array of data storage cells for each individual cylinder, said first array having at least one dimension with each cell corresponding to an RPM setting used in said first two-dimensional data storage cell array;

each cell, in each of said first one-dimensional arrays, storing a correction pulse-width data value which, when algebraically summed with the stored gross pulse-width data value for a given RPM setting, represents a specific amount of fuel necessary to obtain the optimum coefficient of variance for that specific cylinder at corresponding RPM settings used in said first two-dimensional data storage cell array; and electrical circuit means for coupling said microprocessor to each of said one-dimensional storage cell arrays for algebraic addition of each of said gross pulse-width data values to said correction pulse-width data values for each cylinder at each corresponding RPM setting to optimize operation of each cylinder individually with respect to fuel injection.

12. The improved system of claim 11 wherein said first at least one-dimensional array of data storage cells is a two-dimensional array representing throttle position versus RPM.

13. The improved system of claim 11 further including a second two-dimensional data storage cell array coupled to said microprocessor and storing gross ignition timing data values representing the time of ignition of the fuel in all of said cylinders for any given throttle position and RPM setting to further optimize operation of said engine as a whole using the ignition timing, the improved system comprising:

a second array of data storage cells for each cylinder having at least one dimension and with each cell corresponding to an RPM setting used in said second two-dimensional data storage cell array;

each cell in each of said second one-dimensional arrays storing a correction ignition timing data value which, when algebraically summed with the stored gross ignition timing data value for any given RPM setting, provides the ignition timing data value necessary to optimize operation of each cylinder individually with respect to ignition timing; and second electrical circuit means for coupling said microprocessor to each of said second one-dimensional storage cell arrays for algebraic addition of each of said gross ignition timing data values to said corresponding correction ignition timing data values at any given RPM setting to optimize operation of each cylinder individually with respect to ignition timing.

14. The improved system of claim 13 wherein said at least one-dimensional array of data storage cells is a two-dimensional array representing throttle position versus RPM.

15. A method of optimizing internal combustion engine cylinder operation comprising the steps of:

causing the same amount of fuel to be injected into all of the engine cylinders with a single control signal having a given pulse-width;

adjusting the given pulse-width of the single fuel control signal at given throttle positions and RPM settings to obtain a single gross pulse-width fuel control signal for all of said cylinders at each of said given throttle positions and RPM settings to optimize desired gross operating characteristics of the engine;

storing the single gross pulse-width in a two-dimensional data storage cell array for each given throttle position versus RPM setting;

adjusting the single gross pulse-width for each cylinder separately at each RPM setting to obtain a specific pulse-width fuel control signal for each cylinder to obtain desired net engine operating characteristics for the given specific pulse-width fuel control signal;

creating a separate data storage cell array for each individual engine cylinder, each cell array having at least one dimension representing said engine RPM settings;

storing the difference between said gross pulse-width and said specific pulse-width for each cylinder in its corresponding data storage cell array as a correction pulse-width for each of said RPM settings; and algebraically adding said gross pulse-width to said stored correction pulse-width for each individual cylinder at each RPM setting during engine operation to provide a net pulse-width fuel control signal for each separate cylinder to obtain said net optimum engine operating characteristics.

16. The method of claim 15 further including the steps of:

controlling the ignition timing of all of said cylinders with a single ignition timing signal;

adjusting the single ignition timing signal to obtain a single gross ignition timing signal that improves the desired optimized gross operating engine characteristics obtained with said specific fuel control signal pulse-width;

storing the single gross ignition timing signal in a second two-dimensional data storage cell array representing throttle position versus RPM setting;

adjusting the single gross ignition timing signal for each cylinder separately at each RPM setting to obtain a specific ignition timing signal for each cylinder that improves the optimized desired net engine operating characteristics obtained with said specific fuel control signal pulse-width;

creating a second separate data storage cell array for each separate engine cylinder, each of the second cell arrays having at least one dimension representing said engine RPM settings;

storing the difference between the gross ignition timing signal and the specific ignition timing signal for each cylinder in its corresponding data storage cell array as a correction ignition timing data value for each of said RPM settings; and algebraically adding said stored correction ignition timing data value to said stored gross timing signal at each RPM setting to provide a net ignition timing signal for each separate cylinder to improve the net optimum engine operating characteristics obtained solely with said net pulse-width fuel control signal.

* * * * *